US012559315B2

(12) United States Patent
von Bischhoffshausen et al.

(10) Patent No.: US 12,559,315 B2
(45) Date of Patent: Feb. 24, 2026

(54) SMART BIN SYSTEM

(71) Applicant: Trelleborg Sealing Solutions US, Inc., Ft. Wayne, IN (US)

(72) Inventors: Johannes Kunze von Bischhoffshausen, Stuttgart (DE); Ciro Domenico Tucci, Leinfelden-Echterdingen (DE); Sreesh Maroli, Stuttgart (DE)

(73) Assignee: Trelleborg Sealing Solutions US, Inc., Ft. Wayne, IN (US)

( * ) Notice: Subject to any disclaimer, the term of this patent is extended or adjusted under 35 U.S.C. 154(b) by 301 days.

(21) Appl. No.: 16/432,507

(22) Filed: Jun. 5, 2019

(65) Prior Publication Data

US 2019/0375592 A1       Dec. 12, 2019

Related U.S. Application Data

(60) Provisional application No. 62/681,343, filed on Jun. 6, 2018.

(51) Int. Cl.
| | |
|---|---|
| *B65G 1/137* | (2006.01) |
| *G01G 19/52* | (2006.01) |
| *G01L 1/22* | (2006.01) |
| *G06Q 10/087* | (2023.01) |

(52) U.S. Cl.
CPC .......... *B65G 1/1371* (2013.01); *G01G 19/52* (2013.01); *G01L 1/22* (2013.01); *G06Q 10/087* (2013.01)

(58) Field of Classification Search
CPC .... G06Q 10/087; G06Q 20/203; G06Q 10/08; G06Q 10/0875; G06Q 10/06; G06Q 20/208; G06Q 30/02; G06Q 30/0633; G01G 19/52; G01G 19/4144; G01G 19/42; G01G 11/02; G01G 11/04; G01G 11/06; G01G 19/035; G01G 19/047; G01G 19/28; G01G 19/30; B65G 1/1371; G01L 1/22; G01F 3/28; G01F 9/003; G05D 11/04; G05D 11/134; G07G 1/0054; G08B 13/1472; H05B 6/6464; H01L 27/1112; H01L 224/7592; H01L 2224/7692; H01L 2224/7792; H01L 2224/7892; H01L 2224/7992
USPC .......................................................... 705/28
See application file for complete search history.

(56) References Cited

U.S. PATENT DOCUMENTS

| | | | |
|---|---|---|---|
| 2,526,191 | A | 10/1950 | Barker |
| 3,726,383 | A | 4/1973 | Bornfleth et al. |
| 4,891,755 | A | 1/1990 | Asher |
| 5,328,169 | A | 7/1994 | Mandel |
| 6,539,794 | B1 | 4/2003 | Otto et al. |
| 6,816,074 | B2 | 11/2004 | Wong |

(Continued)

FOREIGN PATENT DOCUMENTS

| | | | |
|---|---|---|---|
| EP | 0 915 325 | A1 | 5/1999 |
| EP | 0 969 272 | A1 | 1/2000 |

*Primary Examiner* — Avia Salman
(74) *Attorney, Agent, or Firm* — Orbit IP, LLP; Marc G. Martino

(57) ABSTRACT

A reordering system for automatically reordering one or more objects. The reordering system includes at least one storage bin configured for storing the one or more objects and at least one reorder device positioned within the at least one storage bin. The at least one reorder device including a pressure sensor and a control unit operably coupled to the pressure sensor.

18 Claims, 3 Drawing Sheets

(56) References Cited

U.S. PATENT DOCUMENTS

| | | | |
|---|---|---|---|
| 6,965,310 B1 | 11/2005 | Hoben et al. | |
| 6,980,110 B1 | 12/2005 | Hoben et al. | |
| 6,985,877 B1 | 1/2006 | Hayward et al. | |
| 7,146,246 B2 | 12/2006 | Clarke | |
| 7,233,241 B2 | 6/2007 | Overhultz et al. | |
| 7,502,664 B2 | 3/2009 | Berg | |
| 7,518,068 B2 | 4/2009 | Green | |
| 7,557,310 B2* | 7/2009 | Lai | G06Q 10/0875 |
| | | | 705/28 |
| 7,561,986 B2 | 7/2009 | Vanderveen et al. | |
| 7,715,277 B2 | 5/2010 | Huerga | |
| 7,750,817 B2 | 7/2010 | Teller | |
| 8,239,062 B2 | 8/2012 | Vahlberg et al. | |
| 8,924,262 B2 | 12/2014 | Shuster | |
| 8,994,546 B2 | 3/2015 | Breed et al. | |
| 9,120,622 B1 | 9/2015 | Elazary et al. | |
| 9,358,499 B2 | 6/2016 | Akdogan et al. | |
| 9,424,446 B2 | 8/2016 | Baarman et al. | |
| 2003/0172072 A1 | 9/2003 | Smith | |
| 2004/0254759 A1 | 12/2004 | Kubach et al. | |
| 2008/0215180 A1 | 9/2008 | Kota | |
| 2013/0284806 A1* | 10/2013 | Margalit | G06Q 30/06 |
| | | | 235/382 |
| 2013/0342653 A1 | 12/2013 | McCloskey et al. | |
| 2014/0036072 A1 | 2/2014 | Lyall et al. | |
| 2014/0107953 A1 | 4/2014 | Mueller et al. | |
| 2014/0351068 A1* | 11/2014 | Renfroe | G06Q 10/087 |
| | | | 705/15 |
| 2015/0106228 A1 | 4/2015 | Shuster | |
| 2016/0004994 A1 | 1/2016 | Güttinger | |
| 2016/0048798 A1* | 2/2016 | Meyer | G01G 19/4144 |
| | | | 705/28 |
| 2016/0187189 A1* | 6/2016 | Camp | G06Q 10/087 |
| | | | 705/27.1 |
| 2016/0283898 A1* | 9/2016 | Reuther | G06Q 10/087 |
| 2017/0082477 A1 | 3/2017 | Lee et al. | |
| 2017/0161676 A1 | 6/2017 | Aji | |
| 2017/0206495 A1 | 7/2017 | Ratkovich et al. | |
| 2017/0211969 A1 | 7/2017 | Waite et al. | |
| 2017/0234746 A1* | 8/2017 | Cohen | G06F 3/0414 |
| | | | 73/1.08 |
| 2017/0300984 A1* | 10/2017 | Hurwich | G06Q 10/087 |
| 2018/0053153 A1* | 2/2018 | Mai | G06Q 10/0875 |

* cited by examiner

SMART BIN SYSTEM

CROSS REFERENCE TO RELATED APPLICATIONS

This is a non-provisional application based upon U.S. provisional patent application Ser. No. 62/681,343, entitled "SMART BIN SYSTEM", filed Jun. 6, 2018, which is incorporated herein by reference.

BACKGROUND OF THE INVENTION

1. Field of the Invention

The present invention relates to an inventory reordering control system, and, more particularly, to a smart bin for an inventory reordering system.

2. Description of the Related Art

Traditionally, a worker manually conducted the monitoring and replenishment of inventory. Modern inventory systems have reduced the manual labor required to monitor and restock inventory by automizing the monitoring and reordering of inventory. A typical inventory system generally includes a control system that automatically accounts for each transaction, i.e., sale of inventory. However, such transactional accounting systems may be inaccurate as such systems do not consider inventory which has been lost due to breakage, spoilage, theft, or misidentification.

Other known inventory systems may include a control system and one or more accompanying sensors either attached to the containment unit, e.g. bin, shelf, etc., in which the inventory is contained, or onto the inventory itself. The sensors may be in the form of weight sensors which register and communicate a corresponding signal to the control system when the inventory has been depleted from the container. Alternatively, the sensors may be in the form of radio frequency identification (RFID) tags and the control system tracks when the inventory has been removed from the container. Once the sensors register an empty containment unit(s), the control system may automatically send a reorder command to refill the inventory as needed. Such inventory systems are generally expensive due to the additional cost of the sensors embedded in the containment units or attached to the inventory itself.

What is needed in the art is a cost-effective and easily interchangeable inventory monitoring device for an inventory reordering system.

SUMMARY OF THE INVENTION

The present invention provides a reordering system with at least one storage bin and at least one reorder device removably positioned within the at least one storage bin. The at least one reorder device including a pressure sensor and a control unit operably coupled to the pressure sensor. The at least one reorder device and the at least one storage bin together form a smart bin configured for tracking the one or more objects and automatically reordering the one or more objects.

The invention in one form is directed to a reordering system for automatically reordering one or more objects. The reordering system includes at least one storage bin configured for storing the one or more objects and at least one reorder device positioned within the at least one storage bin. The at least one reorder device including a pressure sensor and a control unit operably coupled to the pressure sensor.

The invention in another form is directed to a reorder device of a reordering system for a storage bin which stores one or more objects. The reorder device includes a baseplate, a covering, and a pressure sensor including a force sensing resistor (FSR) sensor configured for sensing a weight of the one or more objects. The FSR sensor is positioned in between the baseplate and the covering. The reorder device further includes a control unit operably coupled to the pressure sensor.

The invention in yet another form is directed to a method for reordering inventory in the form of one or more objects. The method includes an initial step of providing a reordering system including at least one storage bin configured for storing the one or more objects and at least one reorder device positioned within the at least one storage bin. The at least one reorder device including a pressure sensor and a control unit operably coupled to the pressure sensor. The at least one reorder device further including a cloud server that is operably coupled to the control unit. The method further includes the steps of sensing pressure data by the pressure sensor at set intervals, sending the pressure data by the pressure sensor to the control unit, transmitting the pressure data, by the control unit, to the cloud server for analyzing the pressure data by the cloud server, and automatically reordering the one or more objects.

An advantage of the present invention is the reordering system provides a smart bin configured for automatically tracking and reordering inventory.

Another advantage is of the present invention is that the reorder device, which includes the pressure sensor and control unit, can be easily interchanged from one storage bin to another storage bin.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, in one form, and such exemplifications are not to be construed as limiting the scope of the invention in any manner.

DETAILED DESCRIPTION OF THE INVENTION

Figure 1:
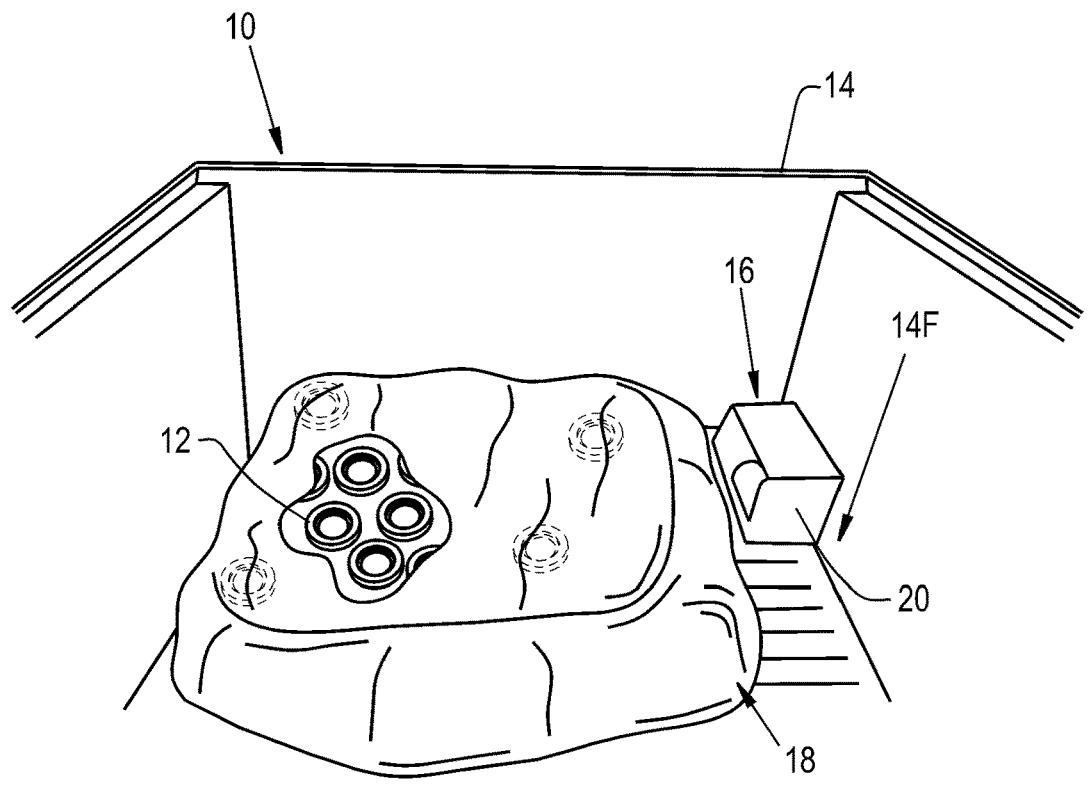
FIG. 1 is a perspective view of the reordering system of the present invention which includes at least one storage bin and at least one all-in-one reorder device.
Figure 2:
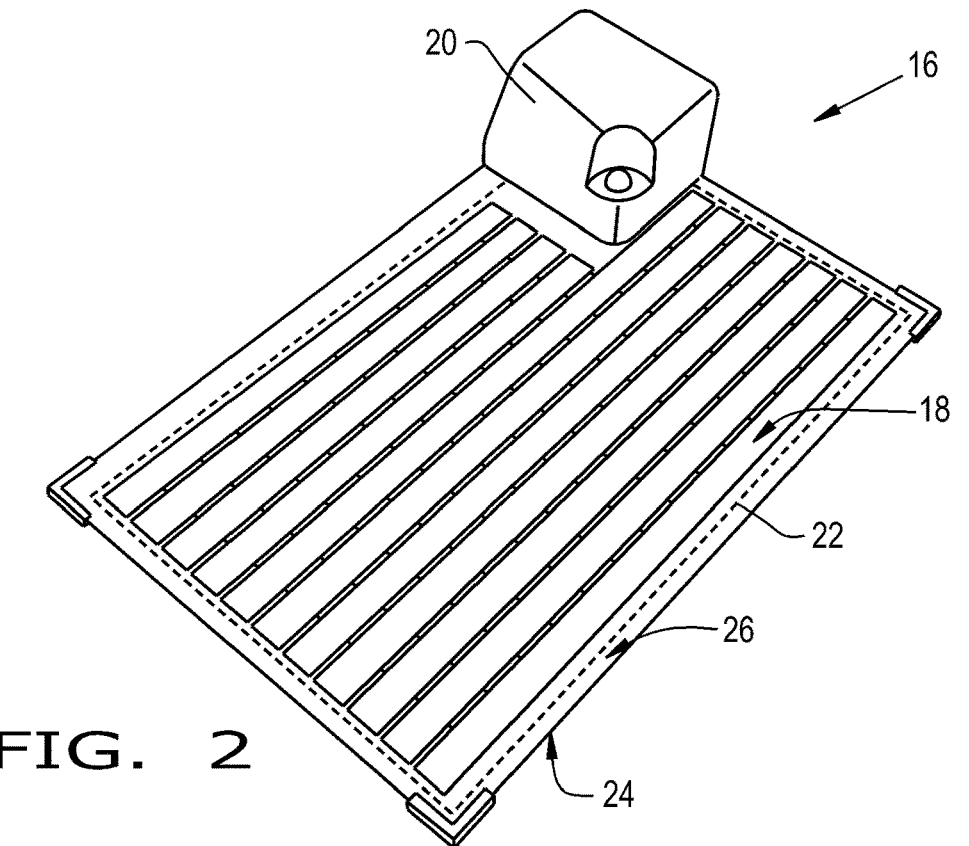
FIG. 2 is a perspective view of the reorder device.
Figure 3:
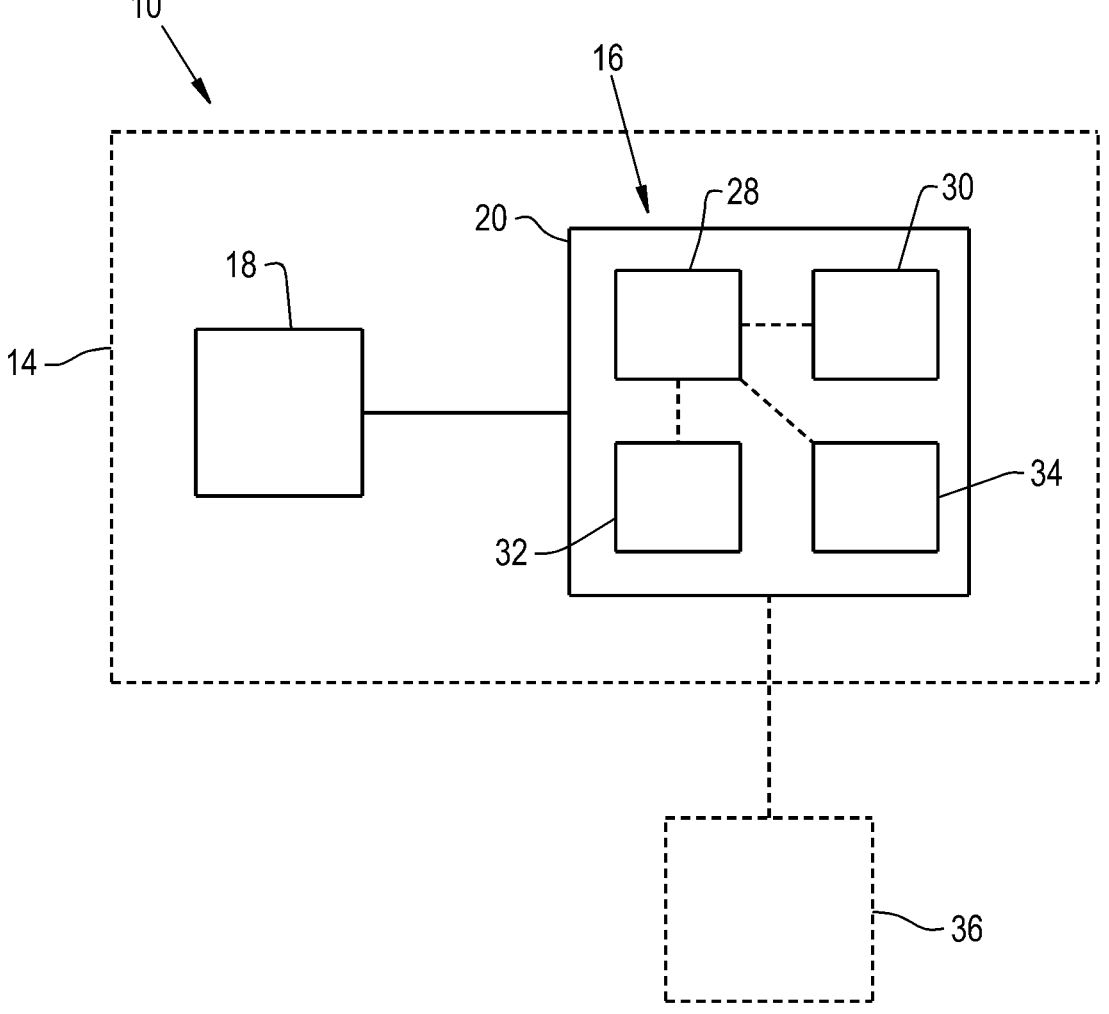
FIG. 3 illustrates a schematic view of the reordering system.

Referring now to the drawings, and more specifically to FIGS. 1-3, there is shown a reordering system 10 for the automatic reordering of one or more object(s) 12. The reordering system 10 generally includes at least one storage bin 14 and at least one all-in-one reorder device 16 that is positioned within a respective storage bin 14. Each reorder device 16 senses the pressure of the object(s) 12 within the storage bin 14, computes pressure data associated with the sensed pressure of the object(s) 12, and automatically reorders additional parts 12 based upon the pressure data. Hence, the reorder device 16 coupled with the storage bin 14 forms a "smart bin" for efficiently tracking data and automatically reordering object(s) 12.

The object(s) 12 can be in the form of any desired article(s), piece(s), widget(s), or component(s) which may be stored within the storage bin 14. The storage bin 14 can be any desired container, holder, shelf, box, etc., that is capable of storing the object(s) 12. As shown, the storage bin 14 has a floor 14F with a rectangular cross-section and an open top for storing multiple objects 12. It should be appreciated that the storage bin 14 may have a cross-section in any desired shape, such as triangular, hexagonal, octagonal, etc., and an open or closed top. The storage bin 14 may be composed of any desired material, such as plastic.

The reorder device 16 may include a pressure sensor 18 and a control unit 20 operably coupled to the pressure sensor 18. The reorder device 16 can be fixedly attached to or removably placed onto the floor 14F of the storage bin 14. Alternatively, the reorder device 16 may be fixedly or removably attached to another location, such as the side, lid, etc., of the storage bin 14. In this regard, the reorder device may be easily interchanged from one storage bin 14 to another storage bin 14.

The pressure sensor 18 consists of a force sensing resistor (FSR) sensor 22 that is positioned on a bottom portion 24, for example a baseplate 24, and covered and protected by a top portion 26, for example a top covering 26, upon which the one or more objects 12 rest (FIG. 2). The FSR sensor 22 conducts pressure measurements on a two-dimensional data matrix, and thereby is capable of not only sensing pressure, e.g. the weight or force of the objects 12, free or constrained in the storage bin 14, but also the location(s) of where the pressure is applied on one or more subarray(s) of the pressure matrix. The pressure sensor 18 can have any desired size and shape. The pressure sensor 18 may or may not have a cross-section which corresponds to the cross-section of the storage bin 14. As shown, the pressure sensor 18 has a rectangular cross-section that matches the cross-section of the storage bin 14. It should be appreciated that the pressure sensor 18 may be uniquely manufactured to fit within a particular type of storage bin 14. The baseplate 24 may comprise any desired shape and any desired material such as metal, rubber, and/or plastic. The top covering 26 may be semi-deformable. The top covering 26 may have any desired surface profile. For example, the surface of the top covering 26 may be smooth or include ridges. The top covering 26 may comprise any desired shape and any desired material such as metal, rubber, textile, and/or plastic. For instance, the bottom portion 24 may comprise plastic, such as a hard, rigid plastic material, and the top portion 26 may comprise another type of plastic, such as a bendable plastic material, and the sensor 22 with the electronics thereof may be located in between the bottom and top portions 24, 26. Alternatively, the pressure sensor 18 may be positioned in between a pair of top and bottom rigid plates.

The control unit 20 is connected to and rests on top of the pressure sensor 18. The control unit 20 is connected to the baseplate 24, via known fasteners and/or adhesives, and further the control unit 20 is operably coupled to the FSR sensor 22. The control unit 20 may be in the form of any desired controller which has a processor 28 for executing software or instructions stored in a computer readable medium 30, for example a memory (FIG. 3). The control unit 20 can be in the form of a microcontroller unit (MCU) 20. The control unit 20 may also include its own power source 32, e.g. a battery, and internet/network connectivity in the form of a receiver and transmitter unit 34. The control unit 20 may also be fitted over a vertical plate portion of the baseplate 24.

The reorder device 16 may further include a cloud server, cloud application or backend application, or processor 36 which is operably coupled to one or more control units 20. Thereby, after the control unit 20 has collected the data, e.g. pressure measurements, sensed by the pressure sensor 18, the control unit 20 may process the pressure measurements and/or send the pressure measurements to the cloud server 36 so that the cloud server 36 may process the pressure measurements. These pressure measurements may be converted by the control unit 20 and/or the cloud server 36 into the average pressure, the total pressure, the pressure variance, and/or the percentage of the surface covered by the parts 12 in the storage bin 14. The control unit 20 and/or the cloud server 36 may analyze stock depletion, stock replenishment, usage patterns, and/or the lead time for deliveries. Additionally, the control unit 20 and/or the cloud server 36 may use adaptive models, which employ machine learning techniques, in order to determine the fullness of the storage bin 14. For instance, an artificial neural network model of the cloud server 36 and/or the control unit 20 may be trained to model the complex, non-linear relationship between the set of pressure signals from the pressure sensor 18 and reference fill-level of the storage bin 14. In this regard, the "smart bin" can become smarter over time as it learns the patterns of usage.

Additionally, the reorder device 16 may be programed to shut down, i.e., sleep, at certain time intervals in order to regulate power consumption. For example, the control unit 20 may turn on every 1-12 hour(s) so that the pressure sensor 18 conducts one or more pressure measurement(s), and the control unit 20 then receives, analyzes, and/or transmits this pressure data onto the cloud application or backend application 36.

Figure 4:
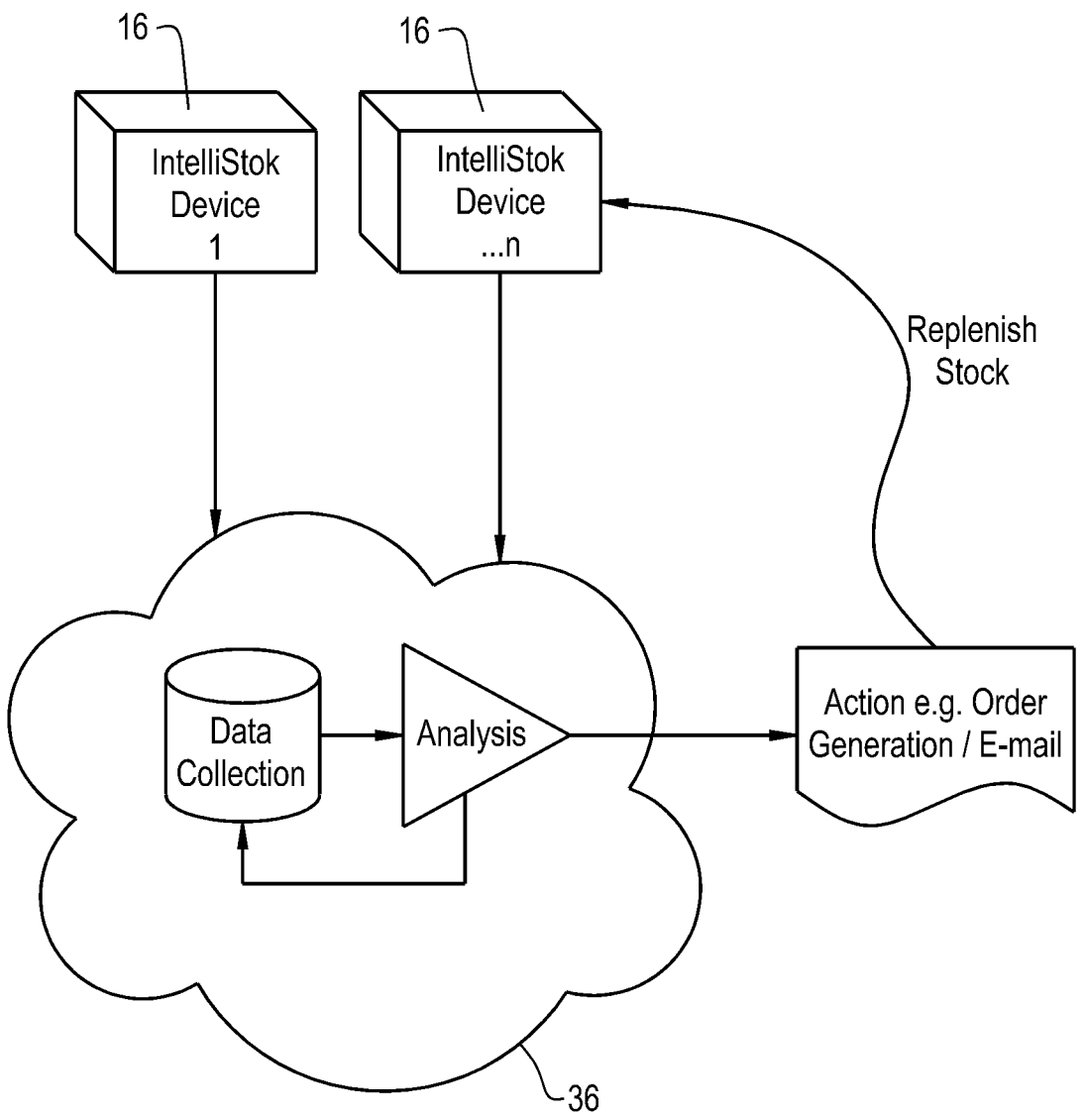
FIG. 4 illustrates a schematic view of a method for reordering the objects according to the present invention.

Referring now to FIG. 4, there is shown a schematic representation of the method for reordering inventory, i.e., the object(s) 12, according to the present invention. The method includes the steps of sensing pressure data by the pressure sensor 18 at set intervals, sending the pressure data from the pressure sensor 18 to the control unit 20 via the pressure sensor 18, transmitting the pressure data, by the control unit 20, to the cloud server 36 which then collects the pressure data, analyzing the pressure data by the cloud server 36 to determine whether one or more storage bin(s) 14 need to be replenished, and reordering the one or more objects 12. The analysis step includes the comparison of the pressure data to a threshold value. For example, the threshold value may be indicative of a zero-pressure signifying an empty storage bin 14, a predetermined minimum total pressure, e.g. a pressure equating to the weight of a specific number of objects 12, and/or a minimum pressure required within one or more subarray(s) of the pressure matrix. The control unit 20 and/or the cloud application or backend application 36, in conjunction with the threshold value, may also take into account the approximate time required to complete a refill order by a delivery service. Further, the control unit 20 and/or the cloud server 36 may aggregate the pressure data across several reorder devices 16 such that a stock replenishment order is not triggered unless a specific number of reorder devices 16, such as two or more reorder devices 16, has been indicated as being at or below the threshold value. Lastly, depending upon the results of the analysis, the method includes an additional step of reordering stock by placing an order for additional parts 12 in an integrated system and/or sending a notification to another computer system and/or individual. For example, if the pressure data indicates that the one or more storage bin 14 have less stock than the threshold value, then the control unit 20 and/or cloud server 36 will trigger the stock replenishment order. The notification may be in the form of an analog or digital signal, for instance, the reordering system 10 can automatically send an alert to an appliance or send one or more emails to an individual and/or computer(s).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A reordering system for automatically reordering one or more objects, the reordering system comprising:
    at least one storage bin configured for storing the one or more objects, the at least one storage bin including a floor with a cross-section; and
    at least one reorder device positioned within the at least one storage bin, the at least one reorder device including a pressure sensor and a control unit operably coupled to the pressure sensor, the pressure sensor including a baseplate, a force sensing resistor sensor and a covering, the force sensing resistor sensor being positioned between the baseplate and the covering, the control unit being mounted on top of the pressure sensor, where the control unit extends upward into the at least one storage bin, the at least one reorder device having a cross-section which matches the cross-section of the floor of the at least one storage bin.

2. The reordering system of claim 1, wherein the at least one reorder device and the at least one storage bin together form a smart bin configured for tracking the one or more objects and automatically reordering the one or more objects.

3. The reordering system of claim 1, wherein the force sensing resistor (FSR) sensor is configured for sensing a weight of the one or more objects.

4. The reordering system of claim 3, wherein the control unit is connected to the baseplate and operably coupled to the FSR sensor.

5. The reordering system of claim 1, wherein the at least one reorder device further includes a cloud server that is operably coupled to the control unit, and at least one of the control unit and the cloud server is configured for processing pressure data from the pressure sensor.

6. The reordering system of claim 1, wherein the at least one storage bin has an open top, and the cross-section of the floor of the at least one storage bin is rectangular.

7. The reordering system of claim 6, wherein the pressure sensor has a rectangular cross-section that matches the rectangular cross-section of the at least one storage bin.

8. The reordering system of claim 6, wherein the at least one reorder device is removably placed onto the floor of the at least one storage bin.

9. A reorder device of a reordering system, comprising:
    a baseplate having a cross-section;
    a covering;

a force sensing resistor (FSR) sensor configured for sensing a weight of a one or more objects, the FSR sensor positioned in between the baseplate and the covering; and
    a control unit operably coupled to the FSR sensor and mounted on top of the covering, where the control unit is disposed above the baseplate, the FSR sensor and the covering;
    wherein the reorder device is configured for being removably placed onto a floor of a storage bin which stores the one or more objects;
    wherein the cross-section of the baseplate is configured to match a cross-section of the floor of the storage bin.

10. The reorder device of claim 9, wherein the reorder device and the storage bin together are configured for forming a smart bin for tracking the one or more objects and automatically reordering the one or more objects.

11. The reorder device of claim 9, further including a cloud server that is operably coupled to the control unit, and at least one of the control unit and the cloud server is configured for processing pressure data from the pressure sensor.

12. The reorder device of claim 9, wherein the pressure sensor has a rectangular cross-section.

13. A method for reordering inventory in the form of one or more objects, comprising:
    providing a reordering system including at least one storage bin configured for storing a one or more objects, the at least one storage bin including a floor with a cross-section, and at least one reorder device positioned within the at least one storage bin, the at least one reorder device including a pressure sensor and a control unit operably coupled to the pressure sensor, the pressure sensor including a baseplate, a force sensing resistor sensor and a covering, the force sensing resistor sensor being positioned between the baseplate and the covering, the control unit being mounted on top of the pressure sensor, where the control unit extends upward into the at least one storage bin, the at least one reorder device further including a cloud server that is operably coupled to the control unit, the at least one reorder device having a cross-section which matches the cross-section of the floor of the at least one storage bin;
    sensing pressure data by the pressure sensor at set intervals;
    sending the pressure data by the pressure sensor to the control unit;
    transmitting the pressure data, by the control unit, to the cloud server for analyzing the pressure data by the cloud server; and automatically reordering the one or more objects.

14. The method of claim 13, wherein analyzing the pressure data by the cloud server includes comparing the pressure data to a threshold value.

15. The method of claim 13, wherein the at least one reorder device and the at least one storage bin together form a smart bin configured for tracking the one or more objects and automatically reordering the one or more objects.

16. The method of claim 13, wherein the force sensing resistor (FSR) sensor is configured for sensing a weight of the one or more objects.

17. The method of claim 13, wherein the at least one reorder device is configured for being removably placed onto the floor of the at least one storage bin.

18. The reordering system of claim 1, wherein the control unit is disposed at a single corner of the at least one storage bin when the at least one reorder device is positioned within the at least one storage bin.

* * * * *